United States Patent
Ferris et al.

(10) Patent No.: US 9,058,834 B1
(45) Date of Patent: Jun. 16, 2015

(54) POWER ARCHITECTURE FOR LOW POWER MODES IN STORAGE DEVICES

(71) Applicant: Western Digital Technologies, Inc., Irvine, CA (US)

(72) Inventors: Timothy A. Ferris, Mission Viejo, CA (US); John R. Agness, Laguna Hills, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 14/537,363

(22) Filed: Nov. 10, 2014

Related U.S. Application Data

(60) Provisional application No. 61/901,905, filed on Nov. 8, 2013.

(51) Int. Cl.
*G11B 15/18* (2006.01)
*G11B 19/20* (2006.01)

(52) U.S. Cl.
CPC ........ *G11B 19/2072* (2013.01); *G11B 19/2054* (2013.01)

(58) Field of Classification Search
CPC .... G11B 2220/90; G11B 27/11; G11B 27/36; G11B 5/012; G11B 5/00; G11B 5/02; G06F 1/3203; G06F 1/26; G06F 1/32
USPC ................. 360/69, 55, 75; 713/300, 330, 320
See application file for complete search history.

(56) References Cited

U.S. PATENT DOCUMENTS

| | | | |
|---|---|---|---|
| 5,345,347 A | 9/1994 | Hopkins et al. | |
| 6,014,283 A | 1/2000 | Codilian et al. | |
| 6,052,076 A | 4/2000 | Patton, III et al. | |
| 6,052,250 A | 4/2000 | Golowka et al. | |
| 6,067,206 A | 5/2000 | Hull et al. | |
| 6,078,453 A | 6/2000 | Dziallo et al. | |
| 6,091,564 A | 7/2000 | Codilian et al. | |
| 6,094,020 A | 7/2000 | Goretzki et al. | |
| 6,094,362 A | 7/2000 | Domingo | |
| 6,101,065 A | 8/2000 | Alfred et al. | |
| 6,104,153 A | 8/2000 | Codilian et al. | |

(Continued)

FOREIGN PATENT DOCUMENTS

WO 2008010795 A1 1/2008

OTHER PUBLICATIONS

John R. Agness, et al., U.S. Appl. No. 14/040,426, filed Sep. 27, 2013, 40 pages.

(Continued)

*Primary Examiner* — Nabil Hindi

(57) ABSTRACT

A power control device comprising an always-on-domain (AOD) which includes control logic circuitry for controlling power from a power source, load switches, bias current generators. The power control device also includes, outside of the AOD, functional blocks. The control logic circuitry is configured to receive a signal to go into a lower power state, initiate a shut-down sequence of the load switches and the bias current generators of the AOD, to disable circuitry outside of the AOD, including the functional blocks of the power control device and loads controlled by the power control device, and operate in a low power state to detect a wake-up signal. The shut-down sequence may additionally include sequencing off voltage regulators outside of the AOD and a clock control inside the AOD.

20 Claims, 5 Drawing Sheets

(56) References Cited

U.S. PATENT DOCUMENTS

| | | |
|---|---|---|
| 6,122,133 A | 9/2000 | Nazarian et al. |
| 6,122,135 A | 9/2000 | Stich |
| 6,141,175 A | 10/2000 | Nazarian et al. |
| 6,160,368 A | 12/2000 | Plutowski |
| 6,181,502 B1 | 1/2001 | Hussein et al. |
| 6,195,222 B1 | 2/2001 | Heminger et al. |
| 6,198,584 B1 | 3/2001 | Codilian et al. |
| 6,198,590 B1 | 3/2001 | Codilian et al. |
| 6,204,988 B1 | 3/2001 | Codilian et al. |
| 6,243,223 B1 | 6/2001 | Elliott et al. |
| 6,281,652 B1 | 8/2001 | Ryan et al. |
| 6,285,521 B1 | 9/2001 | Hussein |
| 6,292,320 B1 | 9/2001 | Mason et al. |
| 6,310,742 B1 | 10/2001 | Nazarian et al. |
| 6,320,718 B1 | 11/2001 | Bouwkamp et al. |
| 6,342,984 B1 | 1/2002 | Hussein et al. |
| 6,347,018 B1 | 2/2002 | Kadlec et al. |
| 6,369,972 B1 | 4/2002 | Codilian et al. |
| 6,369,974 B1 | 4/2002 | Asgari et al. |
| 6,462,896 B1 | 10/2002 | Codilian et al. |
| 6,476,996 B1 | 11/2002 | Ryan |
| 6,484,577 B1 | 11/2002 | Bennett |
| 6,493,169 B1 | 12/2002 | Ferris et al. |
| 6,496,324 B1 | 12/2002 | Golowka et al. |
| 6,498,698 B1 | 12/2002 | Golowka et al. |
| 6,507,450 B1 | 1/2003 | Elliott |
| 6,534,936 B2 | 3/2003 | Messenger et al. |
| 6,538,839 B1 | 3/2003 | Ryan |
| 6,545,835 B1 | 4/2003 | Codilian et al. |
| 6,549,359 B1 | 4/2003 | Bennett et al. |
| 6,549,361 B1 | 4/2003 | Bennett et al. |
| 6,553,501 B1 | 4/2003 | Yokoe |
| 6,560,056 B1 | 5/2003 | Ryan |
| 6,568,268 B1 | 5/2003 | Bennett |
| 6,574,062 B1 | 6/2003 | Bennett et al. |
| 6,577,465 B1 | 6/2003 | Bennett et al. |
| 6,608,729 B1 | 8/2003 | Willems et al. |
| 6,614,615 B1 | 9/2003 | Ju et al. |
| 6,614,618 B1 | 9/2003 | Sheh et al. |
| 6,636,377 B1 | 10/2003 | Yu et al. |
| 6,690,536 B1 | 2/2004 | Ryan |
| 6,693,764 B1 | 2/2004 | Sheh et al. |
| 6,707,635 B1 | 3/2004 | Codilian et al. |
| 6,710,953 B1 | 3/2004 | Vallis et al. |
| 6,710,966 B1 | 3/2004 | Codilian et al. |
| 6,714,371 B1 | 3/2004 | Codilian |
| 6,714,372 B1 | 3/2004 | Codilian et al. |
| 6,724,564 B1 | 4/2004 | Codilian et al. |
| 6,731,450 B1 | 5/2004 | Codilian et al. |
| 6,735,041 B1 | 5/2004 | Codilian et al. |
| 6,738,220 B1 | 5/2004 | Codilian |
| 6,747,837 B1 | 6/2004 | Bennett |
| 6,760,186 B1 | 7/2004 | Codilian et al. |
| 6,788,483 B1 | 9/2004 | Ferris et al. |
| 6,791,785 B1 | 9/2004 | Messenger et al. |
| 6,795,268 B1 | 9/2004 | Ryan |
| 6,819,518 B1 | 11/2004 | Melkote et al. |
| 6,826,006 B1 | 11/2004 | Melkote et al. |
| 6,826,007 B1 | 11/2004 | Patton, III |
| 6,847,502 B1 | 1/2005 | Codilian |
| 6,850,383 B1 | 2/2005 | Bennett |
| 6,850,384 B1 | 2/2005 | Bennett |
| 6,867,944 B1 | 3/2005 | Ryan |
| 6,876,508 B1 | 4/2005 | Patton, III et al. |
| 6,882,496 B1 | 4/2005 | Codilian et al. |
| 6,885,514 B1 | 4/2005 | Codilian et al. |
| 6,900,958 B1 | 5/2005 | Yi et al. |
| 6,900,959 B1 | 5/2005 | Gardner et al. |
| 6,901,520 B2 | 5/2005 | Odaohhara et al. |
| 6,903,897 B1 | 6/2005 | Wang et al. |
| 6,914,740 B1 | 7/2005 | Tu et al. |
| 6,914,743 B1 | 7/2005 | Narayana et al. |
| 6,920,004 B1 | 7/2005 | Codilian et al. |
| 6,924,959 B1 | 8/2005 | Melkote et al. |
| 6,924,960 B1 | 8/2005 | Melkote et al. |
| 6,924,961 B1 | 8/2005 | Melkote et al. |
| 6,934,114 B1 | 8/2005 | Codilian et al. |
| 6,934,135 B1 | 8/2005 | Ryan |
| 6,937,420 B1 | 8/2005 | McNab et al. |
| 6,937,423 B1 | 8/2005 | Ngo et al. |
| 6,952,322 B1 | 10/2005 | Codilian et al. |
| 6,954,324 B1 | 10/2005 | Tu et al. |
| 6,958,881 B1 | 10/2005 | Codilian et al. |
| 6,963,465 B1 | 11/2005 | Melkote et al. |
| 6,965,488 B1 | 11/2005 | Bennett |
| 6,967,458 B1 | 11/2005 | Bennett et al. |
| 6,967,811 B1 | 11/2005 | Codilian et al. |
| 6,970,319 B1 | 11/2005 | Bennett et al. |
| 6,972,539 B1 | 12/2005 | Codilian et al. |
| 6,972,540 B1 | 12/2005 | Wang et al. |
| 6,972,922 B1 | 12/2005 | Subrahmanyam et al. |
| 6,975,480 B1 | 12/2005 | Codilian et al. |
| 6,977,789 B1 | 12/2005 | Cloke |
| 6,980,389 B1 | 12/2005 | Kupferman |
| 6,987,636 B1 | 1/2006 | Chue et al. |
| 6,987,639 B1 | 1/2006 | Yu |
| 6,989,954 B1 | 1/2006 | Lee et al. |
| 6,992,848 B1 | 1/2006 | Agarwal et al. |
| 6,992,851 B1 | 1/2006 | Cloke |
| 6,992,852 B1 | 1/2006 | Ying et al. |
| 6,995,941 B1 | 2/2006 | Miyamura et al. |
| 6,999,263 B1 | 2/2006 | Melkote et al. |
| 6,999,267 B1 | 2/2006 | Melkote et al. |
| 7,006,320 B1 | 2/2006 | Bennett et al. |
| 7,016,134 B1 | 3/2006 | Agarwal et al. |
| 7,023,637 B1 | 4/2006 | Kupferman |
| 7,023,640 B1 | 4/2006 | Codilian et al. |
| 7,027,256 B1 | 4/2006 | Subrahmanyam et al. |
| 7,027,257 B1 | 4/2006 | Kupferman |
| 7,035,026 B2 | 4/2006 | Codilian et al. |
| 7,046,472 B1 | 5/2006 | Melkote et al. |
| 7,050,249 B1 | 5/2006 | Chue et al. |
| 7,050,254 B1 | 5/2006 | Yu et al. |
| 7,050,258 B1 | 5/2006 | Codilian |
| 7,054,098 B1 | 5/2006 | Yu et al. |
| 7,061,714 B1 | 6/2006 | Yu |
| 7,064,918 B1 | 6/2006 | Codilian et al. |
| 7,068,451 B1 | 6/2006 | Wang et al. |
| 7,068,459 B1 | 6/2006 | Cloke et al. |
| 7,068,461 B1 | 6/2006 | Chue et al. |
| 7,068,463 B1 | 6/2006 | Ji et al. |
| 7,088,547 B1 | 8/2006 | Wang et al. |
| 7,095,579 B1 | 8/2006 | Ryan et al. |
| 7,110,208 B1 | 9/2006 | Miyamura et al. |
| 7,110,214 B1 | 9/2006 | Tu et al. |
| 7,113,362 B1 | 9/2006 | Lee et al. |
| 7,113,365 B1 | 9/2006 | Ryan et al. |
| 7,116,505 B1 | 10/2006 | Kupferman |
| 7,126,781 B1 | 10/2006 | Bennett |
| 7,158,329 B1 | 1/2007 | Ryan |
| 7,180,703 B1 | 2/2007 | Subrahmanyam et al. |
| 7,184,230 B1 | 2/2007 | Chue et al. |
| 7,196,864 B1 | 3/2007 | Yi et al. |
| 7,199,966 B1 | 4/2007 | Tu et al. |
| 7,203,021 B1 | 4/2007 | Ryan et al. |
| 7,209,321 B1 | 4/2007 | Bennett |
| 7,212,364 B1 | 5/2007 | Lee |
| 7,212,374 B1 | 5/2007 | Wang et al |
| 7,215,504 B1 | 5/2007 | Bennett |
| 7,224,546 B1 | 5/2007 | Orakcilar et al. |
| 7,248,426 B1 | 7/2007 | Weerasooriya et al. |
| 7,251,098 B1 | 7/2007 | Wang et al. |
| 7,253,582 B1 | 8/2007 | Ding et al. |
| 7,253,989 B1 | 8/2007 | Lau et al. |
| 7,265,933 B1 | 9/2007 | Phan et al. |
| 7,289,288 B1 | 10/2007 | Tu |
| 7,298,574 B1 | 11/2007 | Melkote et al. |
| 7,301,717 B1 | 11/2007 | Lee et al. |
| 7,304,819 B1 | 12/2007 | Melkote et al. |
| 7,330,019 B1 | 2/2008 | Bennett |
| 7,330,327 B1 | 2/2008 | Chue et al. |
| 7,333,280 B1 | 2/2008 | Lifchits et al. |
| 7,333,290 B1 | 2/2008 | Kupferman |
| 7,339,761 B1 | 3/2008 | Tu et al. |

(56) References Cited

U.S. PATENT DOCUMENTS

| | | |
|---|---|---|
| 7,365,932 B1 | 4/2008 | Bennett |
| 7,386,661 B2 | 6/2008 | Perozo et al. |
| 7,388,728 B1 | 6/2008 | Chen et al. |
| 7,391,583 B1 | 6/2008 | Sheh et al. |
| 7,391,584 B1 | 6/2008 | Sheh et al. |
| 7,433,143 B1 | 10/2008 | Ying et al. |
| 7,440,210 B1 | 10/2008 | Lee |
| 7,440,225 B1 | 10/2008 | Chen et al. |
| 7,450,334 B1 | 11/2008 | Wang et al. |
| 7,450,336 B1 | 11/2008 | Wang et al. |
| 7,453,661 B1 | 11/2008 | Jang et al. |
| 7,457,071 B1 | 11/2008 | Sheh |
| 7,466,509 B1 | 12/2008 | Chen et al. |
| 7,468,855 B1 | 12/2008 | Weerasooriya et al. |
| 7,477,471 B1 | 1/2009 | Nemshick et al. |
| 7,480,116 B1 | 1/2009 | Bennett |
| 7,489,464 B1 | 2/2009 | McNab et al. |
| 7,492,546 B1 | 2/2009 | Miyamura |
| 7,495,857 B1 | 2/2009 | Bennett |
| 7,499,236 B1 | 3/2009 | Lee et al. |
| 7,502,192 B1 | 3/2009 | Wang et al. |
| 7,502,195 B1 | 3/2009 | Wu et al. |
| 7,502,197 B1 | 3/2009 | Chue |
| 7,505,223 B1 | 3/2009 | McCornack |
| 7,542,225 B1 | 6/2009 | Ding et al. |
| 7,548,392 B1 | 6/2009 | Desai et al. |
| 7,551,390 B1 | 6/2009 | Wang et al. |
| 7,558,016 B1 | 7/2009 | Le et al. |
| 7,573,670 B1 | 8/2009 | Ryan et al. |
| 7,576,941 B1 | 8/2009 | Chen et al. |
| 7,580,212 B1 | 8/2009 | Li et al. |
| 7,583,470 B1 | 9/2009 | Chen et al. |
| 7,595,954 B1 | 9/2009 | Chen et al. |
| 7,602,575 B1 | 10/2009 | Lifchits et al. |
| 7,616,399 B1 | 11/2009 | Chen et al. |
| 7,619,844 B1 | 11/2009 | Bennett |
| 7,626,782 B1 | 12/2009 | Yu et al. |
| 7,630,162 B2 | 12/2009 | Zhao et al. |
| 7,639,447 B1 | 12/2009 | Yu et al. |
| 7,656,604 B1 | 2/2010 | Liang et al. |
| 7,656,607 B1 | 2/2010 | Bennett |
| 7,660,067 B1 | 2/2010 | Ji et al. |
| 7,663,835 B1 | 2/2010 | Yu et al. |
| 7,675,707 B1 | 3/2010 | Liu et al. |
| 7,679,854 B1 | 3/2010 | Narayana et al. |
| 7,688,534 B1 | 3/2010 | McCornack |
| 7,688,538 B1 | 3/2010 | Chen et al. |
| 7,688,539 B1 | 3/2010 | Bryant et al. |
| 7,697,233 B1 | 4/2010 | Bennett et al. |
| 7,701,661 B1 | 4/2010 | Bennett |
| 7,710,676 B1 | 5/2010 | Chue |
| 7,715,138 B1 | 5/2010 | Kupferman |
| 7,729,079 B1 | 6/2010 | Huber |
| 7,733,189 B1 | 6/2010 | Bennett |
| 7,746,592 B1 | 6/2010 | Liang et al. |
| 7,746,594 B1 | 6/2010 | Guo et al. |
| 7,746,595 B1 | 6/2010 | Guo et al. |
| 7,760,461 B1 | 7/2010 | Bennett |
| 7,800,853 B1 | 9/2010 | Guo et al. |
| 7,800,856 B1 | 9/2010 | Bennett et al. |
| 7,800,857 B1 | 9/2010 | Calaway et al. |
| 7,839,591 B1 | 11/2010 | Weerasooriya et al. |
| 7,839,595 B1 | 11/2010 | Chue et al. |
| 7,839,600 B1 | 11/2010 | Babinski et al. |
| 7,843,662 B1 | 11/2010 | Weerasooriya et al. |
| 7,852,588 B1 | 12/2010 | Ferris et al. |
| 7,852,592 B1 | 12/2010 | Liang et al. |
| 7,864,481 B1 | 1/2011 | Kon et al. |
| 7,864,482 B1 | 1/2011 | Babinski et al. |
| 7,869,155 B1 | 1/2011 | Wong |
| 7,876,522 B1 | 1/2011 | Calaway et al. |
| 7,876,523 B1 | 1/2011 | Panyavoravaj et al. |
| 7,916,415 B1 | 3/2011 | Chue |
| 7,916,416 B1 | 3/2011 | Guo et al. |
| 7,916,420 B1 | 3/2011 | McFadyen et al. |
| 7,916,422 B1 | 3/2011 | Guo et al. |
| 7,929,238 B1 | 4/2011 | Vasquez |
| 7,961,422 B1 | 6/2011 | Chen et al. |
| 8,000,053 B1 | 8/2011 | Anderson |
| 8,031,423 B1 | 10/2011 | Tsai et al. |
| 8,054,022 B1 | 11/2011 | Ryan et al. |
| 8,059,357 B1 | 11/2011 | Knigge et al. |
| 8,059,360 B1 | 11/2011 | Melkote et al. |
| 8,072,703 B1 | 12/2011 | Calaway et al. |
| 8,077,428 B1 | 12/2011 | Chen et al. |
| 8,078,901 B1 | 12/2011 | Meyer et al. |
| 8,081,395 B1 | 12/2011 | Ferris |
| 8,085,020 B1 | 12/2011 | Bennett |
| RE43,211 E | 2/2012 | Schlumberger |
| 8,116,023 B1 | 2/2012 | Kupferman |
| 8,145,934 B1 | 3/2012 | Ferris et al. |
| 8,179,626 B1 | 5/2012 | Ryan et al. |
| 8,189,286 B1 | 5/2012 | Chen et al. |
| 8,213,106 B1 | 7/2012 | Guo et al. |
| 8,254,222 B1 | 8/2012 | Tang |
| 8,300,348 B1 | 10/2012 | Liu et al. |
| 8,315,005 B1 | 11/2012 | Zou et al. |
| 8,320,069 B1 | 11/2012 | Knigge et al. |
| 8,351,174 B1 | 1/2013 | Gardner et al. |
| 8,358,114 B1 | 1/2013 | Ferris et al. |
| 8,358,145 B1 | 1/2013 | Ferris et al. |
| 8,390,367 B1 | 3/2013 | Bennett |
| 8,432,031 B1 | 4/2013 | Agness et al. |
| 8,432,629 B1 | 4/2013 | Rigney et al. |
| 8,433,937 B1 | 4/2013 | Wheelock et al. |
| 8,451,697 B1 | 5/2013 | Rigney et al. |
| 8,472,157 B2 | 6/2013 | Yin et al. |
| 8,482,873 B1 | 7/2013 | Chue et al. |
| 8,498,076 B1 | 7/2013 | Sheh et al. |
| 8,498,172 B1 | 7/2013 | Patton, III et al. |
| 8,508,881 B1 | 8/2013 | Babinski et al. |
| 8,531,798 B1 | 9/2013 | Xi et al. |
| 8,537,486 B2 | 9/2013 | Liang et al. |
| 8,542,455 B2 | 9/2013 | Huang et al. |
| 8,553,351 B1 | 10/2013 | Narayana et al. |
| 8,564,899 B2 | 10/2013 | Lou et al. |
| 8,576,506 B1 | 11/2013 | Wang et al. |
| 8,605,382 B1 | 12/2013 | Mallary et al. |
| 8,605,384 B1 | 12/2013 | Liu et al. |
| 8,610,391 B1 | 12/2013 | Yang et al. |
| 8,611,040 B1 | 12/2013 | Xi et al. |
| 8,612,779 B2 * | 12/2013 | More et al. .................. 713/300 |
| 8,619,385 B1 | 12/2013 | Guo et al. |
| 8,630,054 B2 | 1/2014 | Bennett et al. |
| 8,630,059 B1 | 1/2014 | Chen et al. |
| 8,634,154 B1 | 1/2014 | Rigney et al. |
| 8,634,283 B1 | 1/2014 | Rigney et al. |
| 8,643,976 B1 | 2/2014 | Wang et al. |
| 8,649,121 B1 | 2/2014 | Smith et al. |
| 8,654,466 B1 | 2/2014 | McFadyen |
| 8,654,467 B1 | 2/2014 | Wong et al. |
| 8,665,546 B1 | 3/2014 | Zhao et al. |
| 8,665,551 B1 | 3/2014 | Rigney et al. |
| 8,670,206 B1 | 3/2014 | Liang et al. |
| 8,687,312 B1 | 4/2014 | Liang |
| 8,693,123 B1 | 4/2014 | Guo et al. |
| 8,693,134 B1 | 4/2014 | Xi et al. |
| 8,699,173 B1 | 4/2014 | Kang et al. |
| 8,711,027 B1 | 4/2014 | Bennett |
| 8,717,696 B1 | 5/2014 | Ryan et al. |
| 8,717,699 B1 | 5/2014 | Ferris |
| 8,717,704 B1 | 5/2014 | Yu et al. |
| 8,724,245 B1 | 5/2014 | Smith et al. |
| 8,724,253 B1 | 5/2014 | Liang et al. |
| 8,724,524 B2 | 5/2014 | Urabe et al. |
| 8,737,008 B1 | 5/2014 | Watanabe et al. |
| 8,737,013 B2 | 5/2014 | Zhou et al. |
| 8,743,495 B1 | 6/2014 | Chen et al. |
| 8,743,503 B1 | 6/2014 | Tang et al. |
| 8,743,504 B1 | 6/2014 | Bryant et al. |
| 8,749,904 B1 | 6/2014 | Liang et al. |
| 8,760,796 B1 | 6/2014 | Lou et al. |
| 8,767,332 B1 | 7/2014 | Chahwan et al. |
| 8,767,343 B1 | 7/2014 | Helmick et al. |

(56) References Cited

U.S. PATENT DOCUMENTS

| | | |
|---|---|---|
| 8,767,354 B1 | 7/2014 | Ferris et al. |
| 8,773,787 B1 | 7/2014 | Beker |
| 8,779,574 B1 | 7/2014 | Agness et al. |
| 8,780,473 B1 | 7/2014 | Zhao et al. |
| 8,780,477 B1 | 7/2014 | Guo et al. |
| 8,780,479 B1 | 7/2014 | Helmick et al. |
| 8,780,489 B1 | 7/2014 | Gayaka et al. |
| 8,792,202 B1 | 7/2014 | Wan et al. |
| 8,797,664 B1 | 8/2014 | Guo et al. |
| 8,804,267 B2 | 8/2014 | Huang et al. |
| 8,824,081 B1 | 9/2014 | Guo et al. |
| 8,824,262 B1 | 9/2014 | Liu et al. |
| 2004/0095815 A1 | 5/2004 | Chloupek et al. |
| 2010/0035085 A1 | 2/2010 | Jung et al. |
| 2011/0188146 A1 | 8/2011 | Oh et al. |
| 2012/0194953 A1 | 8/2012 | Mikolajczak |
| 2012/0200967 A1 | 8/2012 | Mikolajczak |
| 2012/0284493 A1 | 11/2012 | Lou et al. |
| 2013/0120870 A1 | 5/2013 | Zhou et al. |
| 2013/0148240 A1 | 6/2013 | Ferris et al. |

OTHER PUBLICATIONS

Timothy A. Ferris, et al., U.S. Appl. No. 14/146,555, filed Jan. 2, 2014, 33 pages.

* cited by examiner

POWER ARCHITECTURE FOR LOW POWER MODES IN STORAGE DEVICES

CROSS REFERENCE TO RELATED APPLICATION

This application claims priority under 35 U.S.C. §119(e) to U.S. Provisional Application No. 61/901,905, filed Nov. 8, 2013, entitled "POWER ARCHITECTURE FOR LOW POWER MODES IN STORAGE DEVICES", which is incorporated herein by reference.

BACKGROUND

Many electronic devices operate in multiple modes of operation, with one of modes usually being a low power mode intended to reduce power consumption. Data storage devices, such as hard disk drives, solid state hybrid drives, and solid state drives, may receive power from a host power supply, which can reside in a desktop or laptop computer or be a standalone power supply, for example. The host may at times indicate to the data storage device that it should go into a low power mode. In many situations, power circuitry inside such an electronic device needs to be able to transition the device into a low power mode that consumes as little power as possible, and quickly transition out of the low power mode if needed.

DETAILED DESCRIPTION

Some embodiments of the present disclosure are directed to power control devices for enabling low power mode support through an always on domain (AOD) without the need of load switches external to the power control device. In one embodiment, the power control device is implemented in a data storage device, and can be configured to transition the data storage device into low power modes required for host commands such as DEVSLP, USB Suspend, and SAS Host Suspend, without the need for FET load switches to cut off power to the components inside the data storage device.

While various embodiments are described herein, these embodiments are presented by way of example only, and not intended to limit the scope of protection. Indeed, the novel methods and devices described herein may be embodied in a variety of other forms. Furthermore, various omissions, substitutions, and changes in the form of the methods and devices described herein may be made without departing from the scope of protection. To illustrate some of the embodiments, reference will now be made to the figures.

Figure 1:
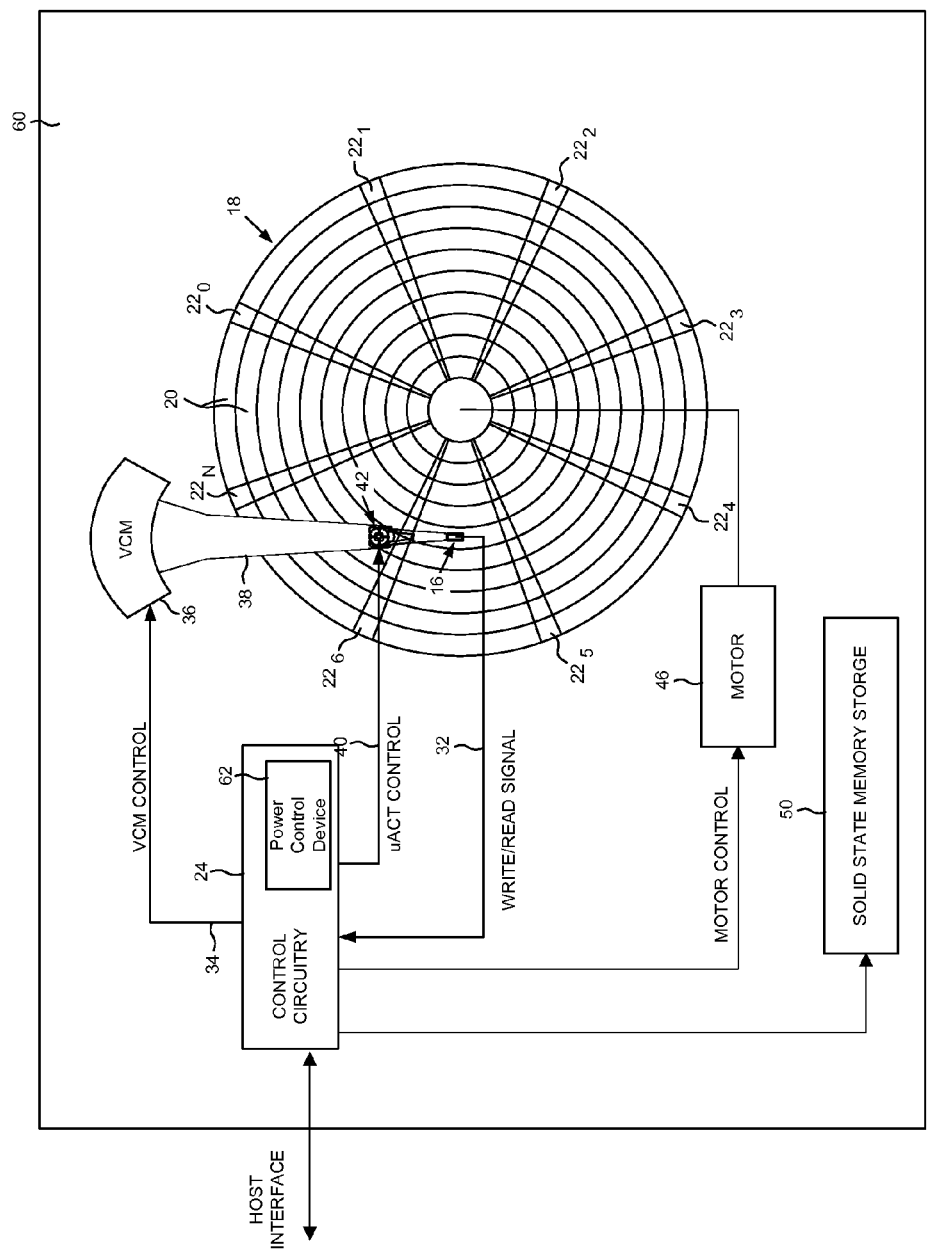
FIG. 1 shows a data storage device with a power control device such as power large scale integrated (PLSI) circuitry according to an embodiment of the invention.

FIG. 1 shows a data storage device 60 according to an embodiment comprising a head 16 and a disk 18 comprising a plurality of servo tracks 20, wherein each servo track comprises a plurality of servo sectors $22_0$-$22_N$. The data storage device further comprises control circuitry 24 comprising a servo control system operable to actuate the head over the disk in response to the servo sectors $22_0$-$22_N$. The disk is rotated by a spindle motor 46 at a rotational speed that is controlled by the control circuitry 24, for example, a motor driver of the control circuitry 24.

In the embodiment of FIG. 1, the control circuitry 24 processes a read signal 32 emanating from the head 16 to demodulate the servo sectors $22_0$-$22_N$ and generate a position error signal (PES) representing an error between the actual position of the head and a target position relative to a target track. A preamplifier (preamp) may be used to improve the read signal 32 from the head 16. In one embodiment, the target track comprises a target data track defined relative to the servo tracks 20, wherein the data tracks may be recorded at the same or different radial density than the servo tracks 20. The control circuitry 24 filters the PES using a suitable compensation filter to generate a control signal 34 applied to a voice coil motor (VCM) 36 which rotates an actuator arm 38 about a pivot in order to actuate the head 16 radially over the disk 18 in a direction that reduces the PES. The control circuitry 24 may also generate a control signal 40 applied to a microactuator 42 in order to actuate the head 16 over the disk 18 in fine movements. Any suitable microactuator 42 may be employed in the embodiments, such as a piezoelectric actuator. In addition, the microactuator 42 may actuate the head 16 over the disk 18 in any suitable manner, such as by actuating a suspension relative to the actuator arm, or actuating a slider relative to the suspension. The servo sectors $22_0$-$22_N$ may comprise any suitable head position information, such as a track address for coarse positioning and servo bursts for fine positioning. The servo bursts may comprise any suitable pattern, such as an amplitude based servo pattern or a phase based servo pattern.

The control circuitry 24 may also control solid state memory storage 50, e.g., memory storage comprising solid state NAND memory. For example, where the data storage device 60 is a solid state hybrid drive (SSHD), data may be stored in solid state memory storage 50 in addition to, or instead of, disk 18. In another embodiment, the data storage device 60 is a solid state drive (SSD) that stores data in solid state memory storage 50 instead of magnetic recording media such as disk 18. In an embodiment, the control circuitry 24 may comprise power control device 62, which may include a PLSI (Power Large Scale Integrated) Circuit. The power control device 62, among other things, controls the power consumption of the various components within the data storage device 60.

In one embodiment, the control circuitry 24 may receive commands from a host via host interface. For example, the power control device 62 may respond to a host command by putting components of the data storage device 60 into a lower power mode such as a sleep mode. It should be noted that although FIG. 1 depicts components of magnetic data storage, some embodiments of the invention may be applied to a pure solid state memory-based data storage device without such magnetic data storage components.

Figure 2:
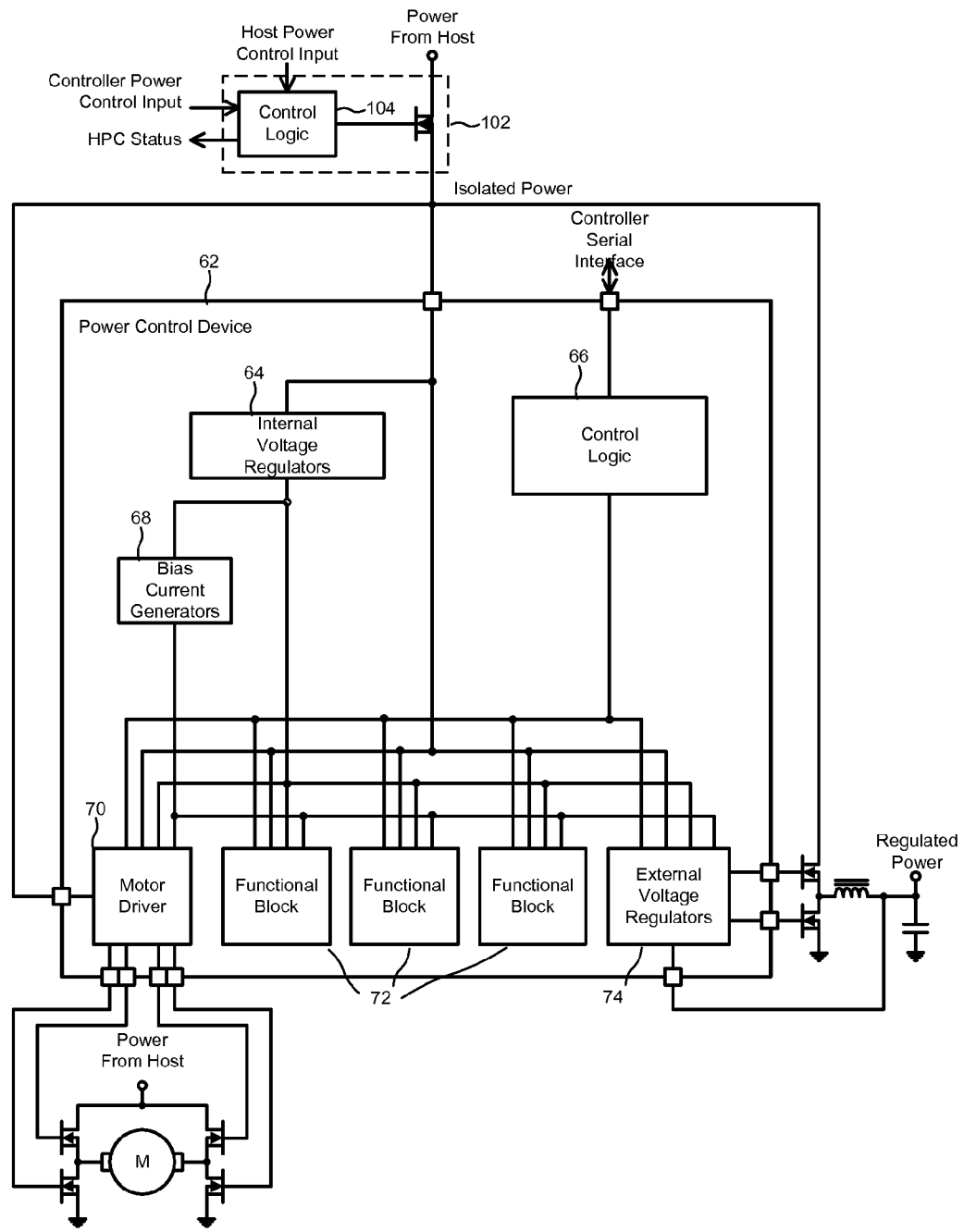
FIG. 2 shows an example power control device that manages transitions to low power modes with switches external to the power control device.

FIG. 2 shows an example power control device that manages transitions to low power modes with switches external to the power control device. In order to reduce data storage device power consumption down to single digit mW levels, the example shown in FIG. 2 relies on using low on-resistance FET switches to cut power to virtually the entire electronics of the data storage device. As shown in FIG. 2, host power and host power control (HPC) input are routed through an HPC block 102, which includes control logic 104. The power control device 62 (which includes internal voltage regulators 64, control logic circuitry 66, bias current generators 68, and various internal functional blocks 72) controls the power provided to the various components of the electronic device. In this example, the electronic device is a data storage device with a spindle motor driven by a motor driver 70. The power control device 62 also controls various voltage regulators 74 external to the power control device.

However, as shown in FIG. 2, the power control device 62 is isolated from the HPC block 102, which is responsible for shutting off power (through the FET switches shown) when the data storage device needs to go into low power state in response to a command from the host. In order to achieve the very low power consumption requirements of modes such as DEVSLP, USB Suspend, and SAS Host Suspend, these FET switches must be sufficiently large and possess very low RDS-ON (Resistance Drain to Source in ON state of a FET transistor), in order to minimize the voltage drop across the FET when in the ON-state. Apart from the FET switches, alternative solutions to enable the low power state include the so called 'e-fuse' components and discrete FETs with appropriate gate drivers and control logic. However, these low power state enablers are discrete components external to the power control device, and thus carry a significant cost burden.

Figure 3:
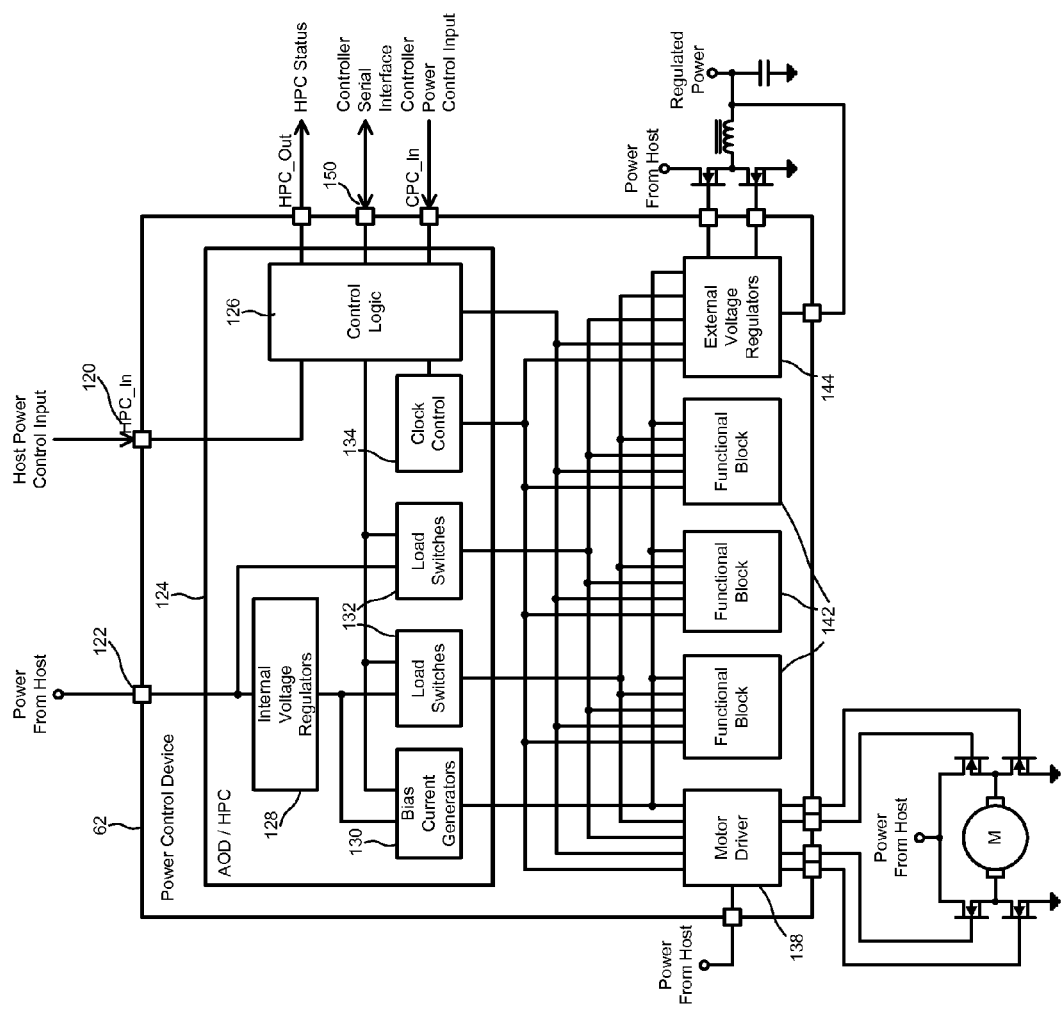
FIG. 3 shows a power control device with an always on domain (AOD) according to an embodiment of the invention.

FIG. 3 shows a power control device with an always on domain (AOD) according to an embodiment of the invention. Unlike the example in FIG. 2, where the host power control is disintegrated or separated from the power control device, the power control device 62 includes an always-on-domain (AOD)/host power control (HPC) 124. The AOD 124 includes, in one embodiment, control logic circuitry 126 for controlling power from a power source (e.g., host power input 122) and internal voltage regulators 128 coupled to the power source. The output of the voltage regulators 128 are fed to bias current generators 130 and load switches 132. In addition, the AOD 124 also includes a clock control 134 controlled by the control logic circuitry 126.

In one embodiment, the power control device 62 includes, outside of the AOD, various functional blocks 142, which generically represent some functional portions of the power control device 62. Some functional blocks 142 are specifically illustrated. For example, FIG. 3 shows a motor driver 138, and voltage regulators 144 configured to regulate voltage from one or more external power sources (e.g., the host). As shown, these components outside of the AOD are powered from internally generated voltage supplies and bias current generators within the AOD.

In contrast to the configuration shown in FIG. 2, the internal voltage regulators 128, the bias current generators 130, the load switches 132, and the clock control 134 are all within the AOD 124, where the control logic circuitry 126 is responsible for power routing and proper control that are necessary to achieve a low or ultra low power state. Such an arrangement enables the low power state support without needing to use aforementioned solutions such as external FET switches.

Figure 4:
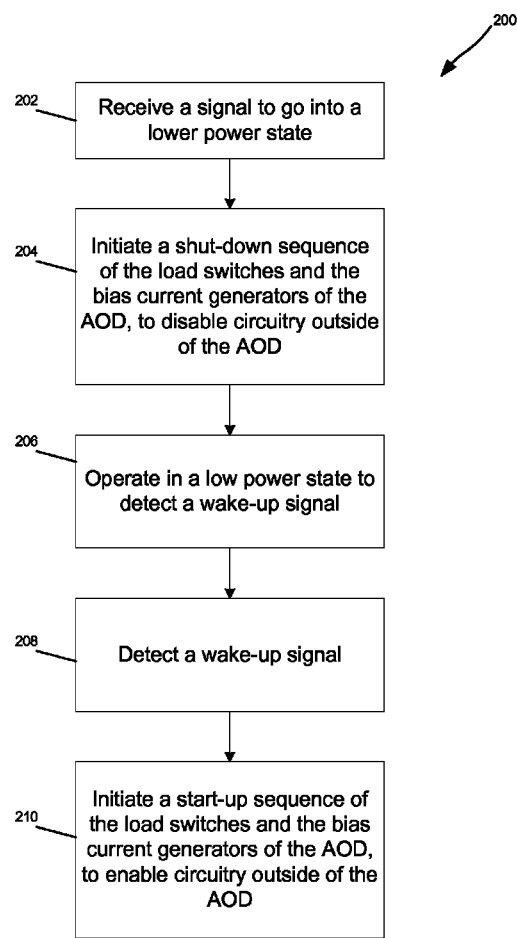
FIG. 4 is a flow chart showing an example operation of the power control device according to an embodiment of the invention.

In one embodiment, the transition to, and out of, a low power state works as shown in the flow diagram of FIG. 4 depicting a process 200. At block 202, the control logic circuitry 126 is configured to receive a signal to go into a lower power state. The signal may be a command from the host power control input 120 (e.g., DEVSLP, Host Suspend, etc.). The various power state commands and the handling of those commands in a power control device are additionally described in co-pending application Ser. No. 14/146,555, filed Jan. 2, 2014, entitled "POWER CONTROL MODULE FOR DATA STORAGE DEVICE" to Ferris et al., which is hereby incorporated by reference. In response to the signal, at block 204, the control logic circuitry may initiate a shut-down sequence of the load switches 132 and the bias current generators 130 within the AOD in a controlled manner, which disables circuitry outside of the AOD. This includes (1) the functional blocks 142 of the power control device and (2) other external loads controlled by the power control device (e.g., DRAM, drive controller (SoC), solid state memory (e.g., NAND) in a data storage device). Additionally, the shut-down sequence may include sequencing off voltage regulators 144 external to the AOD and the clock control 134 within the AOD. If the power control device 62 is in a data storage device with a rotating magnetic recording sub-system, the control logic circuitry 126 may additionally shut power off to the motor driver 138. At block 206, the control logic circuitry 126 may operate in a low power state to detect a wake-up signal to transition out of the low power state. At block 208, a wake-up signal is detected, in response to which the control logic circuitry 126 is configured to initiate a start-up sequence of the components within the AOD to enable circuitry outside of the AOD (block 210).

The AOD/HPC configuration allows for a system level design that can achieve a very low power goal. In an embodiment within a data storage device with a rotating magnetic recording sub-system, except for the preamp supply (e.g., +5V), all data storage device power consumption, passes through, or is controlled by, the power control device. This means that, in one embodiment, reducing the data storage device power consumption can be achieved by means of an appropriate control logic in the AOD of the power control device, along with putting the preamp into a lower power/sleep mode (e.g., with firmware) to take care of the one power domain not under control of the power control device. The power saving that can be achieved can be significant in some embodiments. Once the shut-down sequence is complete, the power draw could be, for example, in the range of hundreds of uA.

In one embodiment, the control logic circuitry 126 may be configured to communicate the status of the HPC, via HPC_Out, to a controller of the data storage device (not shown). In addition, in one embodiment, the AOD 124 may include a serial interface 150 through which firmware executing from an external controller could invoke a transition to a low power mode (e.g., an Ultra Low Power (ULP) mode). For example, the firmware could cause the VCM to be retracted and spindle motor to be spun-down (as part of going into a Sleep mode) and then invoke the ULP mode in the control logic circuitry 126 through the serial interface 150.

In one embodiment, upon receiving the signal from the host indicating a first type of transition (e.g., DEVSLP) to a lower power state, the control logic circuitry 126 is configured to send a signal to the controller of the data storage device to cause the controller to initiate one or more operations to prepare the data storage device to enter into the low power state (e.g., finish last writes, spin down disk, park head, etc.). The control logic circuitry 126 then awaits an input signal from the controller that the operations are complete, and then initiates the shut-down sequence after receiving the input signal from the data storage device's controller.

In another embodiment, upon receiving the signal from the host indicating a second type of transition to a lower power state (e.g., Host Suspend), the control logic circuitry 126 is configured to initiate the shut-down sequence without waiting for the input signal from the data storage device's controller.

In one embodiment, upon receiving a wake signal from the host (e.g., received via input 120), the AOD 124 is configured in one embodiment to reverse the sequence as follows:

a) Turn on internal voltage and current sources to enable circuitry outside of the AOD;

b) Sequence all regulators on in a controlled manner;

c) A ULP status bit is read (e.g., by firmware) to determine if it is a cold boot or coming out of ULP mode; and d) A state is changed (e.g., by firmware) from ULP mode to Sleep to Ready modes.

In one embodiment, there are additional architectural changes from a device physics standpoint that may be implemented. To achieve low current within the power device for deep sleep modes and eliminate latch up through SCR (Silicon-Controlled Rectifier) action for load switches in high current paths, a deep trench isolation process technology may be utilized in one embodiment. The deep trench isolation technologies typically increase the packing density of devices, by bringing them closer together to minimize die size increases. Isolation spacing within the deep trench should follow minimum design requirements to prevent internal transistor cross conduction mechanisms. Deep trench isolation also reduces the effects of inter-well latch up and SCR parasitics. The mixed signal device will have a significant reduction in junction capacitance, reducing parasitics. Deep trench isolation will also reduce effects of fly back currents and voltages seen in data storage technology from motors or recirculating currents as the devices enter or awake from these modes.

Figure 5:
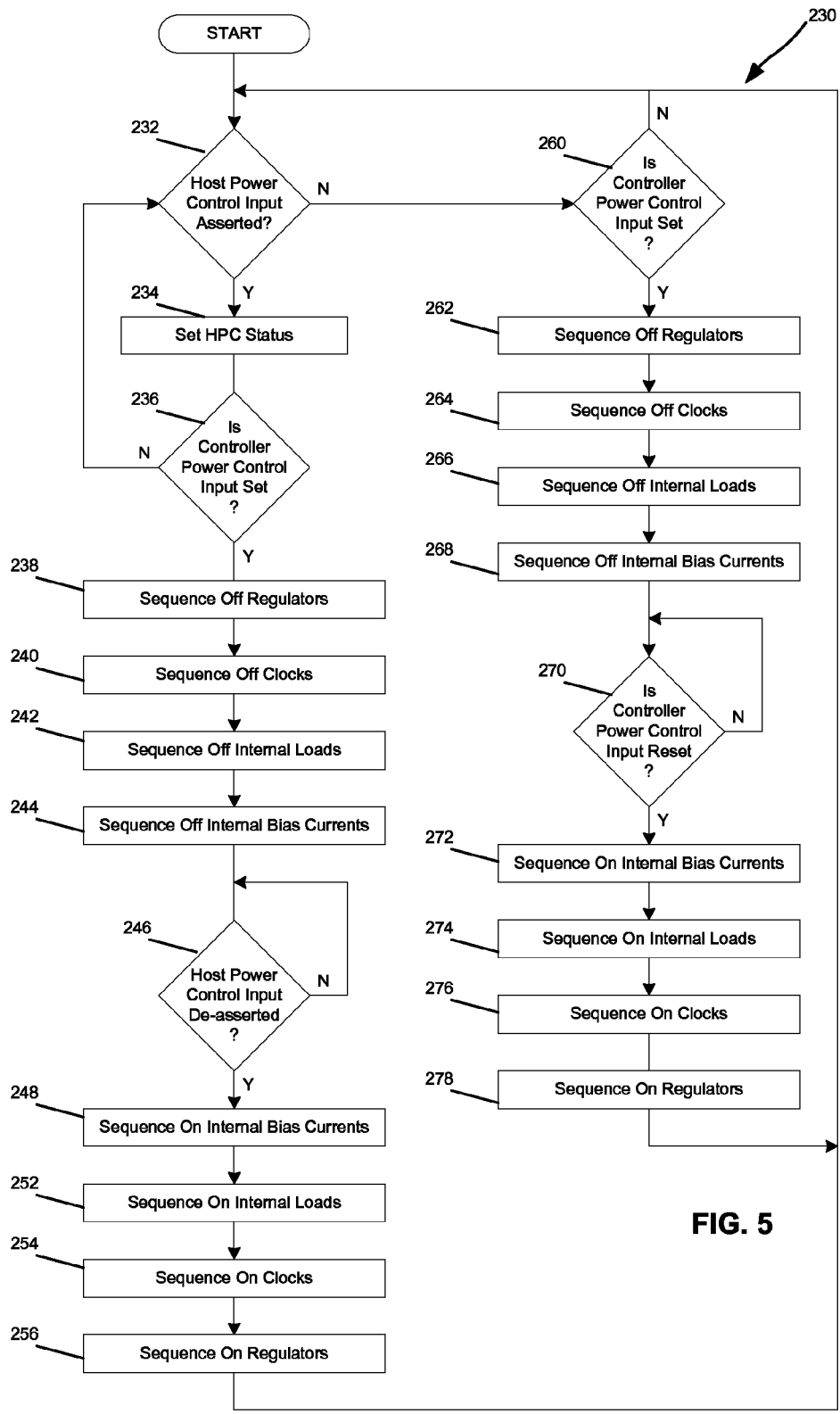
FIG. 5 is a flow chart showing another example operation of the power control device according to an embodiment of the invention.

FIG. 5 is a flow chart showing another example process 230 of the power control device according to an embodiment of the invention. At block 232, the control logic circuitry 126 detects whether the host power control input has been asserted. If so (Y branch), at block 234 it sets the host power control status, which allows for firmware in the data storage device controller to detect that the host power control input has been asserted. In that way, the firmware can perform housekeeping operations to ready the data storage device for the transition to the low power state. Once the housekeeping operations are completed, the firmware may indicate through the controller power input readiness for the next stage of the low power state transition. Therefore, at block 236, the controller power control input is checked to see if it has been set. If so, the shut-down sequence is initiated, which in one embodiment includes sequencing off the regulators (block 238), the clocks (block 240), the internal loads (block 242) and the internal bias currents (block 244). After which the circuitry outside of the AOD is disabled and a low power state is achieved.

At block 246, the control logic circuitry 126 detects whether the host power control input has been de-asserted. As long as it has not been de-asserted (N branch), the low power state persists. However, if it has been de-asserted (Y branch), the control logic circuitry 126 initiates the start-up sequence to wake from the low power state, which in one embodiment includes sequencing on the internal bias currents (block 248), the internal loads (block 250), the clocks (block 252), and the regulators (block 254). This completes the transition out of the low power state and the flow returns to the top.

Going back to block 232, on the N branch, the control logic circuitry 126 checks whether the controller power control input has been set (block 260). If so, a similar shut-down sequence is followed in one embodiment to sequence off the regulators (block 262), the clocks (block 264), the internal loads (block 266) and the internal bias currents (block 268). The device is now in a low power state. When the controller power control input is reset at block 270, the control logic circuitry 126 in one embodiment initiates the start-up sequence to wake from the low power state, which in one embodiment includes sequencing on the internal bias currents (block 272), the internal loads (block 274), the clocks (block 276), and the regulators (block 278). This completes the transition out of the low power state and the flow returns to the top.

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a disk controller, or certain operations described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the data storage device is powered on. In yet another embodiment, the control circuitry comprises suitable logic circuitry, such as state machine circuitry. Also, the various components described may be implemented as software and/or firmware on a processor, ASIC/FPGA, or dedicated hardware. As an additional example, some of the above described power module embodiments may be implemented in electronic devices other than data storage devices.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of protection is defined only by the claims.

What is claimed is:

1. A power control device comprising:
   an always-on-domain (AOD) comprising:
      control logic circuitry for controlling power from a power source;
      a plurality of load switches; and
      a plurality of bias current generators; and
   a plurality of functional blocks,
   wherein the control logic circuitry is configured to:
      receive a signal to go into a lower power state;
      initiate a shut-down sequence of the load switches and the bias current generators of the AOD, to disable circuitry outside of the AOD, including the functional blocks of the power control device and loads controlled by the power control device; and
      operate in a low power state to detect a wake-up signal.

2. The power control device as recited in claim 1, wherein the power control device is in a data storage device and the signal and the power source are from a host coupled to the data storage device.

3. The power control device as recited in claim 2, wherein the control logic circuitry is coupled to a controller in the data storage device.

4. The power control device as recited in claim 3, wherein the control logic circuitry is further configured to:
   upon receiving the signal from the host indicating a first type of transition to a lower power state,
      send a signal to the controller to cause the controller to initiate one or more operations to prepare the data storage device to enter into the low power state;
      await an input signal from the controller that the operations are complete; and
      initiate the shut-down sequence after receiving the input signal from the controller.

5. The power control device as recited in claim 4, wherein the control logic circuitry is further configured to:
   upon receiving the signal from the host indicating a second type of transition to a lower power state,
      initiate the shut-down sequence without waiting for an input signal from the controller.

6. The power control device as recited in claim 1, wherein the AOD further comprises a plurality of clocks and the shut-down sequence additionally includes sequencing off the clocks.

7. The power control device as recited in claim 6, further comprising a plurality of voltage regulators outside of the AOD, wherein the shut-down sequence additionally includes sequencing off the plurality of voltage regulators outside of the AOD.

8. The power control device as recited in claim 7, further the control logic circuitry is further configured to perform shut-down sequence by:
   sequencing off the regulators;
   sequencing off the clocks;
   sequencing off the load switches; and
   sequencing off the bias current generators.

9. The power control device as recited in claim 1, further the control logic circuitry is further configured to:
   detect a wake-up signal; and
   initiate a start-up sequence of the load switches and the bias current generators of the AOD, to enable circuitry outside of the AOD, including the functional blocks of the power control device and loads controlled by the power control device.

10. An integrated circuit comprising the power control device as recited in claim 1.

11. A data storage device comprising the power control device as recited in claim 1.

12. A method for operating a power control device comprising an always-on-domain (AOD) that includes for control logic circuitry controlling power from a power source, a plurality of load switches and a plurality of bias current generators; and
   a plurality of functional blocks, the method comprising:
      receiving a signal to go into a lower power state;
      initiating a shut-down sequence of the load switches and the bias current generators of the AOD, to disable circuitry outside of the AOD, including the functional blocks of the power control device and loads controlled by the power control device; and
      operating in a low power state to detect a wake-up signal
   wherein the method is performed by the control logic circuitry of the AOD.

13. The method as recited in claim 12, wherein the power control device is in a data storage device and the signal and the power source are from a host coupled to the data storage device.

14. The method as recited in claim 13, wherein the power control device is coupled to a controller in the data storage device.

15. The method as recited in claim 14, further comprising:
   upon receiving the signal from the host indicating a first type of transition to a lower power state,
      sending a signal to the controller to cause the controller to initiate one or more operations to prepare the data storage device to enter into the low power state;
      awaiting an input signal from the controller that the operations are complete; and
      initiating the shut-down sequence after receiving the input signal from the controller.

16. The method as recited in claim 15, further comprising:
   upon receiving the signal from the host indicating a second type of transition to a lower power state,
      initiating the shut-down sequence without waiting for an input signal from the controller.

17. The method as recited in claim 12, wherein the AOD further comprises a plurality of clocks and the shut-down sequence additionally includes sequencing off the clocks.

18. The method as recited in claim 17, wherein the power control device further comprises a plurality of voltage regulators outside of the AOD, wherein the shut-down sequence additionally includes sequencing off the plurality of voltage regulators outside of the AOD.

19. The method as recited in claim 18, wherein performing shut-down sequence further comprises:
   sequencing off the regulators;
   sequencing off the clocks;
   sequencing off the load switches; and
   sequencing off the bias current generators.

20. The method as recited in claim 12, further comprising:
detecting a wake-up signal; and
initiating a start-up sequence of the load switches and the bias current generators of the AOD, to enable circuitry outside of the AOD, including the functional blocks of the power control device and loads controlled by the power control device.

\* \* \* \* \*